United States Patent [19]

Figuls, Juan

[11] 3,795,794

[45] Mar. 5, 1974

[54] MAGNETIC CARD HAVING SLOT FOR STRAIN RELIEF

[75] Inventor: Juan Figuls, Saint-Michel-sur-Orge, France

[73] Assignee: Compagnie, Industrielle Des Telecommunications Cit-Alcatel, Paris, France

[22] Filed: Feb. 28, 1972

[21] Appl. No.: 229,967

[30] Foreign Application Priority Data

Feb. 26, 1971 France ..........................7106747

[52] U.S. Cl...... 235/61.12 M, 179/100.2 A, 274/4 J

[51] Int. Cl.......................... G06k 19/04, G11b 5/80

[58] Field of Search 235/61.12 M, 61.7 B, 61.11 D, 235/61.12 R; 340/149 A; 194/4 R; 101/369, 395, 269; 179/100.2 A

[56] References Cited

UNITED STATES PATENTS

| | | | |
|---|---|---|---|
| 3,015,087 | 12/1961 | O'Gorman | 235/61.7 B |
| 3,530,280 | 9/1970 | Goldman | 235/61.7 B |
| 3,513,298 | 5/1970 | Riddle et al. | 235/61.7 B |
| 3,069,496 | 12/1962 | Blinken et al. | 235/61.11 D |
| 2,093,555 | 9/1937 | Ford | 235/61.12 R |
| 3,657,521 | 4/1972 | Constable | 235/61.7 B |

*Primary Examiner*—Thomas J. Sloyan
*Attorney, Agent, or Firm*—Craig and Antonelli

[57] ABSTRACT

A magnetic card comprising a plasticized rectangular support equipped on or under one of the surfaces thereof with at least one magnetic track, the two edges of which are essentially parallel with respect to each other and to the longitudinal edges of the card characterized in that the contour thereof includes at least one longitudinal notch in one of the longitudinal edges whose depth is in the order of several tenths of millimeters.

9 Claims, 1 Drawing Figure

PATENTED MAR 5 1974 3,795,794
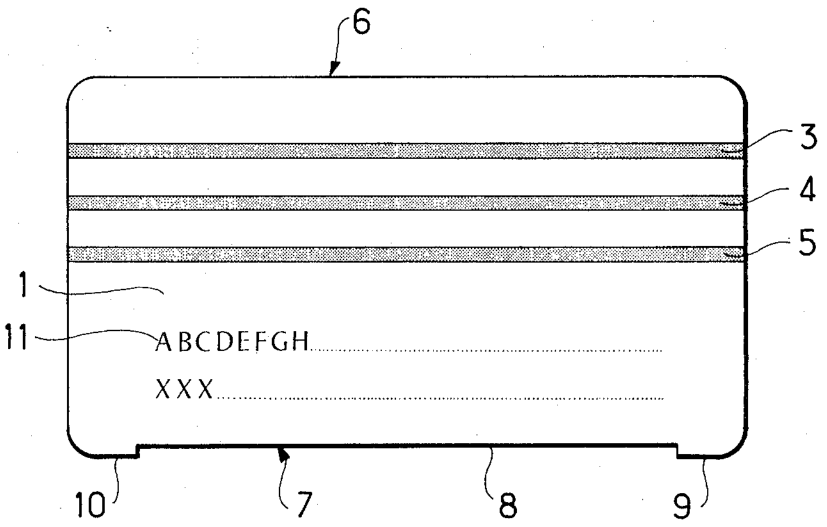

MAGNETIC CARD HAVING SLOT FOR STRAIN RELIEF

The present invention relates to a magnetic card and to a method for making the same.

The French Patent of addition No. 93,470 of June 27, 1967, describes a magnetic cord of laminated construction made up of a plurality of plasticized layers, at least one of which is provided either on the internal or external surface thereof with at least one magnetic track. The contour of such a card, which is generally rectangular, is designed to cooperate with a card receiving slot having parallel edges formed by a guiding device including a pair of parallel guides in a magnetic reader. A magnetic card of the type described hereinabove further comprises most frequently non-coded indications or data imprinted in the plasticized support thereof to provide owner identification, for example.

A method for making such a magnetic card consists in the first place in superimposing and assembling, by thermal welding, a plurality of plasticized layers, at least one layer of which carries on one of its surfaces at least one magnetic track. The next step is cutting the plate thus obtained into rectangles, the edges of which are parallel to the magnetic track. The final step is providing the card with owner identifying data by means of punching or embossing identifying characters or symbols into the plasticized support of the card thus formed.

It has been noted that the magnetic cards which have the form or shape described hereinabove and which are made according to the method disclosed hereinbefore undergo a wedging or jamming effect when they are introduced into the slot of the aforementioned magnetic reader. This is very disadvantageous since it could result in damage to the card, and in any event result in rapid wearing of the card necessitating its early replacement.

The present invention is directed to and concerned with a magnetic card comprising a plasticized support equipped on one of the surfaces thereof with at least one magnetic track, the edges of which are essentially parallel with respect to each other, and characterized in that its contour displays, along at least one of the aforementioned longitudinal edges, at least one longitudinal notch whose depth is in the order of several tenths of millimeters.

Other characteristics of the present invention will become apparent from the following description thereof, when taken in connection with and with reference to the accompanying drawing, the single FIGURE of which has been given by way of example and which illustrates in a top plan view one example of a magnetic card as proposed by the present invention.

Such a magnetic card comprises a plasticized laminated support 1 consisting of a plurality of superimposed plastic foils or layers, one of which is provided on either the internal or external surface thereof with a plurality of parallel magnetic tracks 3, 4 and 5. These magnetic tracks are preferably disposed on the internal surface of the outer layer or layers so as to embed the tracks, which construction has the advantage of affording a mechanical protection of these tracks against any possible abrasion or wear and tear.

The magnetic card illustrated herein comprises two opposite longitudinal edges 6 and 7 which are essentially parallel with respect to each other and, a longitudinal notch or recess 8 disposed along the edge 7 and having a small depth in the order of several tenths of millimeters.

The notch 8 is preferably limited by the two ends or corner portions 9 and 10 of the edge 7 which have the purpose of correctly guiding the magnetic card within the slot of a magnetic reader.

The plasticized support 1 of the magnetic card is provided with characters or symbols 11 which are obtained either by punching or embossing and are designed, for example, to provide identification of the owner of the card. These characters are disposed generally opposite the notch 8. It has been found that a magnetic card of this type can be introduced into the slot of a reader without any difficulty.

In order to produce such a card, one superimposes and assembles, by means of thermal welding, different plasticized foils or layers, one of which is equipped with magnetic tracks. One then cuts into the plate thus obtained a rectangle, one edge of which has a longitudinal notch of two tenths of a millimeter, and one proceeds thereafter with producing characters 11 in the card generally opposite the aforementioned notch or recess by either punching or by embossing.

By way of example, a magnetic card as proposed by the present invention may be used as an identity card, as a payment card or charge plate, or the like.

It is understood that the method indicated by the present invention has been given only by way of example and is not limited in any way to the embodiment described and disclosed herein. More particularly, certain provisions therein may be changed, or specific means may be substituted for equivalent means without departing from the spirit and scope of the present invention.

What I claim is:

1. A magnetic card adaptable to be inserted into a slot of a magnetic reader, comprising: a plasticized generally rectangular support means provided with a pair of longitudinally extending edge portions and a first pair of transversely extending edge portions, said edge portions defining therebetween an indicia receiving surface; at least one magnetic track provided on a portion of said indicia receiving surface of said support means; at least one line of non-coded indicia in the form of raised characters provided on a portion of said indicia receiving surface; and means provided in one of said pair of longitudinally extending edge portions for preventing the wedging of the card in the slot of the magnetic reader including: a second pair of transversely extending edge portions provided in said at least one of said pair of longitudinally extending edge portions between said first pair of transversely extending edge portions, and an additional longitudinally extending edge portion disposed between said second pair of transversely extending edge portions, said second pair of transversely extending edge portions and said additional longitudinally extending edge portion defining therebetween a recess for compensating for deformation of the card resulting from providing the card with raised characters, said recess extending substantially over the entire length of the longest line of non-coded indicia.

2. A magnetic card as defined in claim 1, wherein said magnetic track is parallel to the longitudinally extending edge portions of said support means.

3. A magnetic card as defined in claim 2, wherein said support means is formed of a plurality of laminated layers, said magnetic track being provided between a pair of said laminated layers.

4. A magnetic card as defined in claim 3, wherein said at least one line of non-coded indicia is disposed between said recess and said magnetic track.

5. A magnetic card as defined in claim 4, wherein said at least one line of non-coded indicia is provided in said support closely adjacent said recess.

6. A magnetic card as defined in claim 5, wherein said recess is only several tenths of a millimeter in depth.

7. A magnetic card as defined in claim 1, wherein said support means is formed of a plurality of laminated layers, said magnetic track being provided between a pair of said laminated layers.

8. A magnetic card as defined in claim 1, wherein said non-coded indicia is disposed between said recess and said magnetic track.

9. A magnetic card as defined in claim 1, wherein said recess is only several tenths of a millimeter in depth.

* * * * *